United States Patent
Takada et al.

(10) Patent No.: US 10,484,200 B2
(45) Date of Patent: Nov. 19, 2019

(54) CONTROLLER AREA NETWORK (CAN) COMMUNICATION SYSTEM AND ERROR INFORMATION RECORDING DEVICE

(71) Applicants: National University Corporation Nagoya University, Nagoya-shi, Aichi (JP); AutoNetworks Technologies, Ltd., Yokkaichi-shi, Mie (JP); Sumitomo Wiring Systems, Ltd., Yokkaichi-shi, Mie (JP); Sumitomo Electric Industries, Ltd., Osaka-shi, Osaka (JP)

(72) Inventors: Hiroaki Takada, Nagoya (JP); Ryo Kurachi, Nagoya (JP); Naoki Adachi, Yokkaichi (JP)

(73) Assignees: National University Corporation Nagoya University, Nagoya-shi, Aichi-ken (JP); AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 127 days.

(21) Appl. No.: 15/528,274

(22) PCT Filed: Nov. 18, 2015

(86) PCT No.: PCT/JP2015/082341
§ 371 (c)(1),
(2) Date: May 19, 2017

(87) PCT Pub. No.: WO2016/080417
PCT Pub. Date: May 26, 2016

(65) Prior Publication Data
US 2017/0373878 A1 Dec. 28, 2017

(30) Foreign Application Priority Data

Nov. 20, 2014 (JP) ................................. 2014-235781

(51) Int. Cl.
*H04L 12/403* (2006.01)
*H04L 12/40* (2006.01)

(52) U.S. Cl.
CPC ...... *H04L 12/403* (2013.01); *H04L 12/40195* (2013.01); *H04L 2012/40215* (2013.01)

(58) Field of Classification Search
None
See application file for complete search history.

(56) References Cited

U.S. PATENT DOCUMENTS 5,033,047 A 7/1991 Uehara
2006/0277444 A1* 12/2006 Holian ............... G06F 11/0745
714/41

(Continued)

FOREIGN PATENT DOCUMENTS

JP H01-293450 A 11/1989
JP 2004-348274 A 12/2004

(Continued)

OTHER PUBLICATIONS

Serch Report for International Application No. PCT/JP2015082341, dated Feb. 9, 2016, 2 pp.

*Primary Examiner* — Yaotang Wang
(74) *Attorney, Agent, or Firm* — Honigman LLP (57) ABSTRACT

Provided are a CAN communication system and an error information recording device that may be expected to facilitate identification of the cause of any error occurring in communication. The monitoring device is connected to a CAN bus and determines whether or not an error is included in a message transmitted by an ECU. In the case where an error is included in the transmitted message, the monitoring (Continued)

device records, in the recording unit, information concerning the error in the message as error information. Furthermore, the monitoring device comprises the CAN controller performing communication in accordance with the CAN protocol and the processor performing various types of information processing. The CAN controller may determine whether or not an error is included in message transmission, and if determined that an error is included, may notify the processor of the CAN-ID attached to the message by an interrupt.

5 Claims, 8 Drawing Sheets (56) References Cited

U.S. PATENT DOCUMENTS

| | | | |
|---|---|---|---|
| 2012/0005297 A1* | 1/2012 | Robles Gil Daellenbach | ............ G07F 9/02 709/208 |
| 2012/0019581 A1* | 1/2012 | Miura | ............ B41J 2/16585 347/14 |
| 2012/0311412 A1 | 12/2012 | Kai | |
| 2014/0172227 A1* | 6/2014 | Tsukidate | ............ G06F 11/0739 701/29.2 |

FOREIGN PATENT DOCUMENTS

| | | |
|---|---|---|
| JP | 2009-202720 A | 9/2009 |
| JP | 2012-252404 A | 12/2012 |

* cited by examiner

MONITORING INFORMATION

| CAN-ID | ERROR FREQUENCY | ERROR PROCESSING | RELATED MESSAGE | RELATED ERROR PROCESSING |
|---|---|---|---|---|
| 1 | 2 | EXTERNAL NOTIFICATION | 2 | EXTERNAL NOTIFICATION |
| 2 | 10 | INTERNAL NOTIFICATION | 1 | INTERNAL NOTIFICATION |
| 3 | 5 | NO PROCESSING | – | NO PROCESSING |
| ⋮ | ⋮ | ⋮ | ⋮ | ⋮ |

FIG. 4

ERROR INFORMATION

| TIME | CAN-ID | DLC | PAYLOAD | PRESENCE /ABSENCE OF ERROR | ERROR TYPE | ERROR POSITION |
|---|---|---|---|---|---|---|
| 06:30:00 | 100 | 2 | xx xx xx xx xx xx xx xx | PRESENCE | BIT ERROR | 5 |
| 06:30:10 | 98 | 3 | xx xx xx xx xx xx xx xx | PRESENCE | ACK ERROR | 10 |
| 06:30:11 | 35 | 8 | xx xx xx xx xx xx xx xx | PRESENCE | CRC ERROR | 98 |
| 06:30:14 | 24 | 8 | xx xx xx xx xx xx xx xx | PRESENCE | FORM ERROR | 101 |
| ... | ... | ... | ... | ... | ... | ... |

CONTROLLER AREA NETWORK (CAN) COMMUNICATION SYSTEM AND ERROR INFORMATION RECORDING DEVICE

CROSS-REFERENCE TO RELATED APPLICATIONS

This application is the national phase under 35 U.S.C. § 371 of PCT International Application No. PCT/JP2015/082341 which has an International filing date of Nov. 18, 2015 and claims priority to Japanese Application No. 2014-235781 filed on Nov. 20, 2014.

FIELD

The present disclosure relates to a communication system in which multiple communication devices perform communication in accordance with a CAN protocol, and to an error information recording device monitoring the communication performed by the communication devices.

BACKGROUND

Conventionally, the communication protocol of CAN has widely been employed in communication between multiple electronic control units (ECUs) mounted in a vehicle. A communication system with the CAN communication protocol is so configured that multiple ECUs are connected to a common CAN bus, and messages are transmitted and received by an ECU at the reception side obtaining a signal output from an ECU at the transmission side to the CAN bus.

In such a communication system, various proposals have been made for how to address any error occurring in communication.

For example, Japanese Patent Application Laid-Open Publication No. 2004-348274 has proposed a communication failure diagnostic device in which a provisional failure determination flag is set and a continued failure determination timer is actuated if any one of abnormal states of error warning, error passive or bus off is detected as a result of monitoring the state of the CAN bus, and thereafter, when a failure determination time elapses without an error active state being detected twice in succession, a failure confirmation flag indicating a confirmed failure is set so that a "limp home" function is started.

In an existing communication system employing the CAN communication protocol, if an error occurs in communication, a communication device that transmits a message is able to know the occurrence of the error only when the error occurs during transmission of the message transmitted by itself. If a malfunction or the like occurs in the communication system, therefore, it is necessary to inspect all the communication devices included in the communication system for the malfunction in order to inspect as to which message transmission/reception is subject to an error, which makes it difficult to identify the cause of malfunction. The communication failure diagnostic device according to Japanese Patent Application Laid-Open Publication No. 2004-348274 cannot solve such a problem.

SUMMARY

The present disclosure has been made in view of the above circumstances, and aims to provide a CAN communication system and an error information recording device that may be expected to facilitate identification of the cause of an error if the error occurs in communication.

A CAN communication system according to an aspect of the present disclosure comprising a plurality of communication devices connected to each other via a common communication line and performing communication in accordance with a controller area network (CAN) protocol comprises: an error determination part connected to the communication line and determining whether or not an error is included in a message transmitted by at least one of the communication devices; and an error information recording part recording information concerning an error in the message if the error determination part determines that the error is included in the message.

Moreover, in the CAN communication system according to an aspect of the present disclosure, the information recorded in the error information recording part includes identification information attached to a message.

Moreover, in the CAN communication system according to an aspect of the present disclosure, the information recorded in the error information recording part includes at least one piece of information among time information concerning an occurrence of an error, a payload of a message, a size of the payload, a type of an error or the position of an error in a message.

Moreover, in the CAN communication system according to an aspect of the present disclosure, the error information recording device includes an error processing details storage part storing details of error processing performed if the error determination part determines that an error is included in a message, for each piece of identification information attached to a message, and an error processing part performing error processing based on the details stored in the error processing details storage part.

Moreover, in the CAN communication system according to an aspect of the present disclosure, the error processing details storage part stores a condition for performing error processing, and the error processing part is configured to perform error processing if the error determination part determines that an error is included in a message and a condition stored in the error processing details storage part is satisfied.

Moreover, in the CAN communication system according to an aspect of the present disclosure, the error information recording device includes a CAN controller controlling transmission and reception of a message in accordance with a CAN protocol and having the error determination part, and a processor performing processing of recording information in the error information recording part, wherein the CAN controller notifies, if the error determination part determines that an error is included in a message, the processor of identification information attached to the message, and the processor is configured to record information notified from the CAN controller in the error information recording part.

Moreover, an error information recording device according to an aspect of the present disclosure, comprising: an error determination part connected to a common communication line connected to a plurality of communication devices performing communication in accordance with a controller area network (CAN) protocol, and determining whether or not an error is included in a message transmitted by at least one of the communication devices; and an error information recording part recording, if the error determination part determines that an error is included in a message, information related to the error of the message.

According to an aspect of the present disclosure, an error information recording device is connected to a common communication line through which multiple communication devices communicate, and if a message is transmitted by the communication devices, whether or not an error is included in the message is determined. In the case where an error is included in the transmitted message, the error information recording device records therein information concerning the error in the message. This allows the error information recording device to record information related to the error in message transmission for all the communication devices in the CAN communication system. Accordingly, if a malfunction occurs in the CAN communication system, information that can identify the cause of the malfunction may be obtained by inspecting information recorded in the error information recording device.

According to another aspect of the present disclosure, the information recorded in the error information recording device includes identification information (so-called CAN-ID) attached to a message. This can facilitate identification of a communication device which transmitted a message in which an error occurs.

According to a further aspect of the present disclosure, the information to be recorded in the error information recording device includes at least one of time information concerning the occurrence of an error, the payload of a message, the size of the payload, the type of an error or the location of an error. This facilitates more specific identification of the cause of the error occurrence.

According to another aspect of the present disclosure, the error information recording device stores therein error processing details for each piece of message identification information, and if an error occurs, error processing is performed in accordance with the identification information. For example, the error information recording device may perform error processing such as notification of the occurrence of an error to an external device outside the vehicle through wireless communication or the like, display of an alert message or output of alarm sound in the vehicle, or shutdown of the system. The error processing may set appropriate processing details for each piece of message identification information.

According to another aspect of the present disclosure, the error information recording device stores therein a condition under which error processing is performed, and if an error occurs and the stored condition is satisfied, error processing is performed. The condition for the error processing may be set for each piece of message identification information. Accordingly, the error information recording device may perform error processing not simply when an error occurs but in accordance with the frequency, situation or the like of the occurrence of an error.

According to another aspect of the present disclosure, the error information recording device comprises a CAN controller controlling communication in accordance with the CAN protocol and a processor performing various types of information processing. The CAN controller may determine whether or not an error is included in message transmission, and if an error is included, may notify the processor of identification information attached to the message. In the case of being notified of the occurrence of an error, the processor performs processing of recording error information including the notified identification information.

The conventional CAN controller has no function of notifying the processor of information such as identification information at the time of the error occurrence. The processor can only obtain information concerning an error occurring in a message transmitted by its own device. Such a configuration that the CAN controller notifies the processor of identification information of the message including an error allows the processor to obtain information related to an error occurring in a message transmitted by another device, and to record error information related to all the communication devices in the system.

According to the present disclosure, the error information recording device connected to a common communication line on which multiple communication devices perform communication is configured to record information related to an error in message transmission by each of the communication devices, and if a malfunction occurs in the CAN communication system, information that can identify the cause of the malfunction may be obtained by inspecting information recorded in the error information recording device. According to the present disclosure, therefore, if an error occurs in communication, it may be expected to facilitate identification of the cause thereof.

The above and further objects and features will more fully be apparent from the following detailed description with accompanying drawings.

DETAILED DESCRIPTION

<System Configuration>

Figure 1:
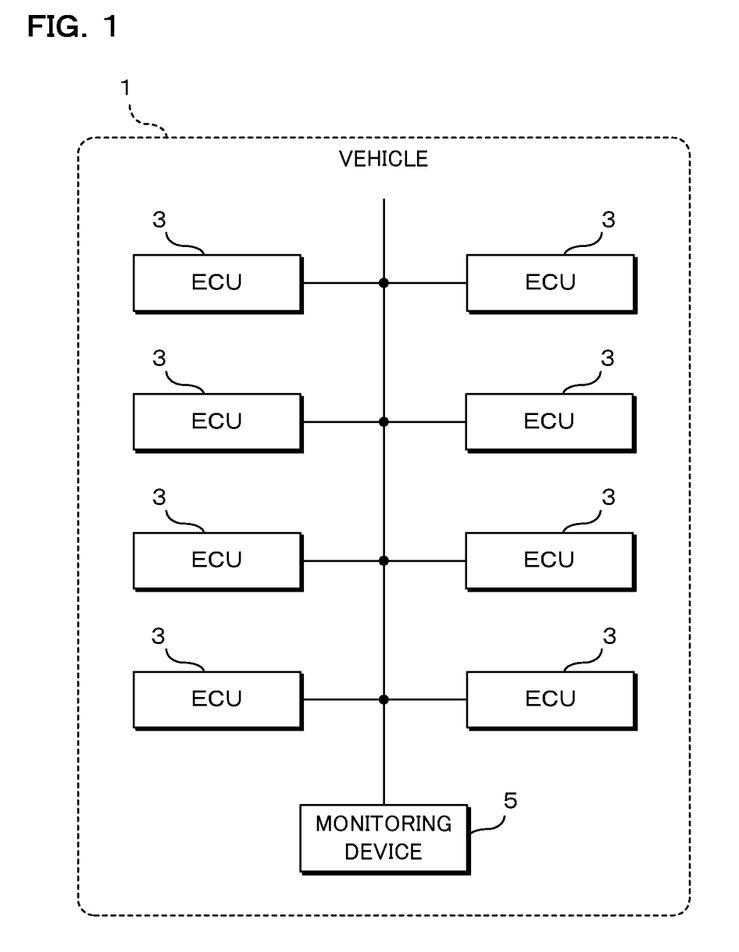
FIG. 1 is a schematic diagram illustrating a configuration of a communication system according to an embodiment of the present disclosure.

FIG. 1 is a schematic diagram illustrating a configuration of a communication system according to the present embodiment. The communication system according to the present embodiment is configured to include multiple ECUs 3 mounted to the vehicle 1, and one monitoring device 5. The ECUs 3 and the monitoring device 5 are connected with one another via a common communication line installed in the vehicle 1, and may transmit and receive messages to/from one another. According to the present embodiment, a CAN bus is employed as the communication line, and the ECUs 3 and monitoring device 5 perform communication according to the CAN protocol. The ECUs 3 may be, for example, various electronic control devices such as an engine ECU controlling the engine of the vehicle 1, a body ECU controlling an electric component of a vehicle body, an ABS-ECU performing control related to an antilock brake system (ABS) or an air bag ECU controlling an air bag of the vehicle 1. The monitoring device 5 is a device for monitoring an error occurring in transmission and reception of messages in an in-vehicle network. The monitoring device 5 may be provided as a device dedicated for monitoring, for example, configured with a monitoring function added to a device such as a gateway, for example, or configured with a monitoring function added to any one of the ECUs 3, for example.

Figure 2:
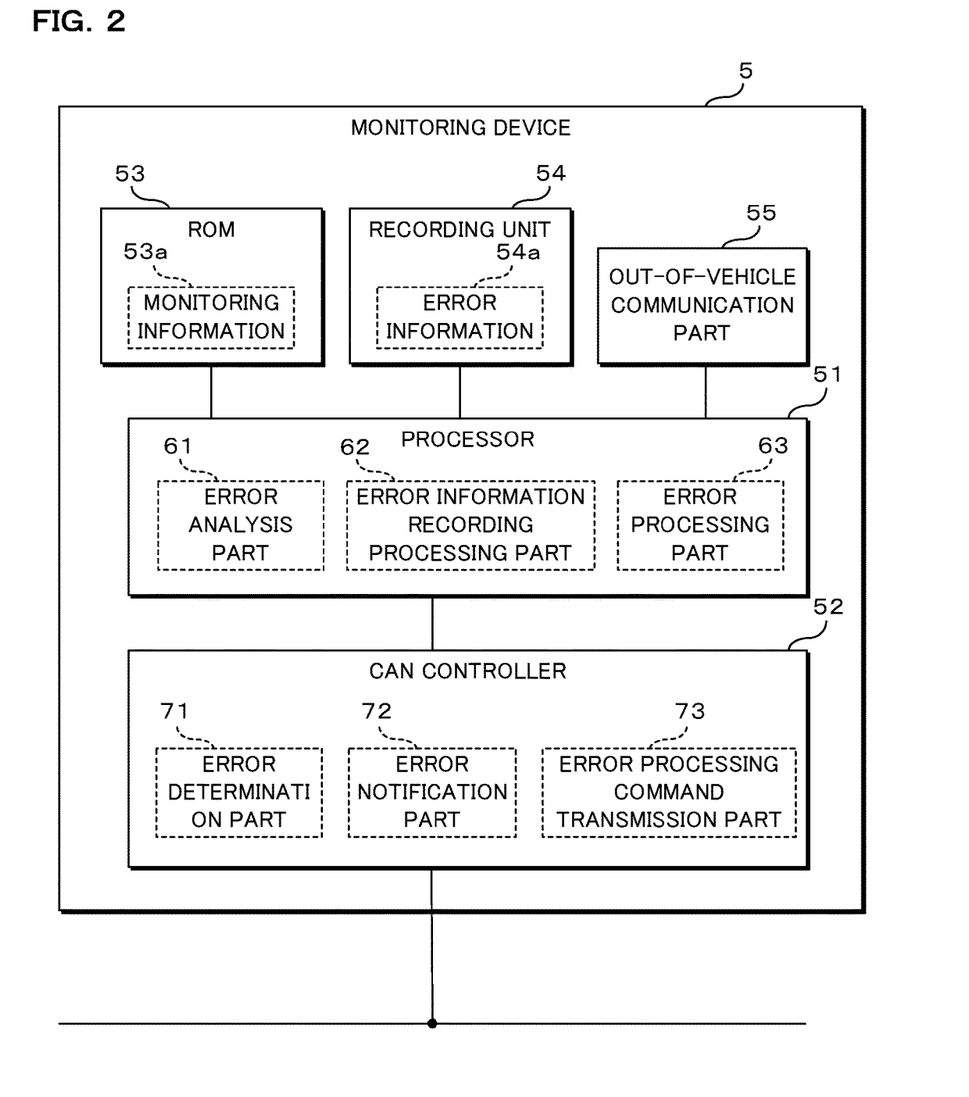
FIG. 2 is a block diagram illustrating a configuration of a monitoring device.

FIG. 2 is a block diagram illustrating a configuration of the monitoring device 5. The monitoring device 5 is configured to include a processor 51, a CAN controller 52, a read only memory (ROM) 53, a recording unit 54, an out-of-vehicle communication part 55 and so forth. The processor 51 is an arithmetic processing device such as a central processing unit (so-called CPU) or micro-processing unit (MPU), and performs processing of monitoring an error in communication in the in-vehicle network by reading out and executing a program stored in the ROM 53, the recording unit 54 or the like. Moreover, by the execution of a program, the processor 51 is provided with software functional blocks such as an error analysis part 61, an error information recording processing part 62, an error processing part 63 and the like. The processing performed by these functional blocks will be described later in detail.

The CAN controller 52 performs communication with the ECUs 3 via the CAN bus in accordance with the CAN communication protocol. The CAN controller 52 converts information for transmission sent from the processor 51 into a signal according to the CAN communication protocol and outputs the converted signal to the CAN bus, to transmit information to the ECUs 3. The CAN controller 52 obtains a signal output by the ECUs 3 by sampling the potential at the CAN bus and receives information by converting the signal into binary information in accordance with the CAN communication protocol, to send the received information to the processor 51. The function related to transmission/reception of the message by the CAN controller 52 is similar to the function of the existing CAN controller.

The CAN controller 52 in the monitoring device 5 according to the present embodiment includes an error determination part 71, an error notification part 72, an error processing command transmission part 73 and so forth. The error determination part 71 determines whether or not an error is included in the message transmitted by the ECUs 3 onto the CAN bus. The error notification part 72 notifies the processor 51 of information related to a message determined as including an error by the error determination part 71. In the case where a command for error processing is sent from the processor 51, the error processing command transmission part 73 transmits a command for performing the operation of error processing on an appropriate ECU 2 in accordance with the details of error processing.

Figure 3:
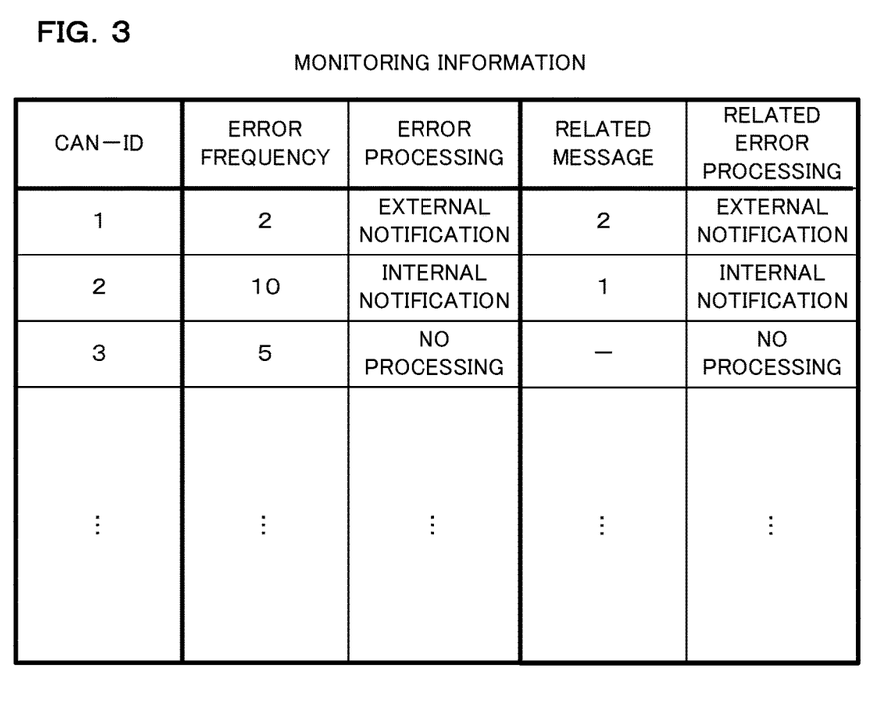
FIG. 3 is a schematic diagram illustrating an example of monitoring information.

The ROM 53 is configured with a non-volatile memory element such as a mask ROM or an electrically erasable programmable read only memory (EEPROM). The ROM 53 according to the present embodiment stores information such as the details of error processing performed by the processor 51 in the case where an error occurs in communication, as monitoring information 53a. FIG. 3 is a schematic diagram illustrating an example of monitoring information 53a. The monitoring information 53a includes the details of error processing to be performed at the time when an error occurs, which are stored for each CAN-ID attached to a message. The monitoring information 53a is decided at a design stage of the CAN communication system or the monitoring device 5, and is stored in the ROM 53 in advance. It is noted that these pieces of information may be encrypted and then stored in the ROM 53.

In the monitoring information 53a, information including error frequency, error processing, related message and related error processing are stored in association with the CAN-ID of each message. The error frequency in the monitoring information 53a represents a condition as to how many times errors occur in succession for the message of the CAN-ID of interest to perform error processing. For example, for the message with the CAN-ID of 1 and the error frequency set as 2, error processing is performed if errors occur twice in succession, while error processing is not performed if normal message transmission is carried out after one error occurs. The error processing in the monitoring information 53a stores the details of error processing performed in the case where the condition for error processing is satisfied. Though an external notification, an internal notification and no processing are set in the present example, processing such as system shutdown, stopping of specific ECU operation or discarding of a message including an error may also be performed. In the error processing of the external notification, a notification to an external server device or the like is performed by the out-of-vehicle communication unit 55. In the error processing of the internal notification, an operation command is given to an appropriate ECU 3, to notify the user in the vehicle 1 of the occurrence of an error by, for example, lighting of an alert lamp, display of a warning message or output of alarm sound.

The relevant message in the monitoring information 53a represents a condition of error processing performed if errors occur in multiple messages with different CAN-IDs. In the illustrated example, the message with the CAN-ID of 1 is associated with the message with the CAN-ID of 2, and error processing is performed if an error occurs in the message with the CAN-ID of 1 and, in sequence therewith, an error also occurs in the message with the CAN-ID of 2. Under the relevant error processing in the monitoring information 53a, the details of error processing performed if the condition of the relevant message is satisfied are stored.

Figure 4:
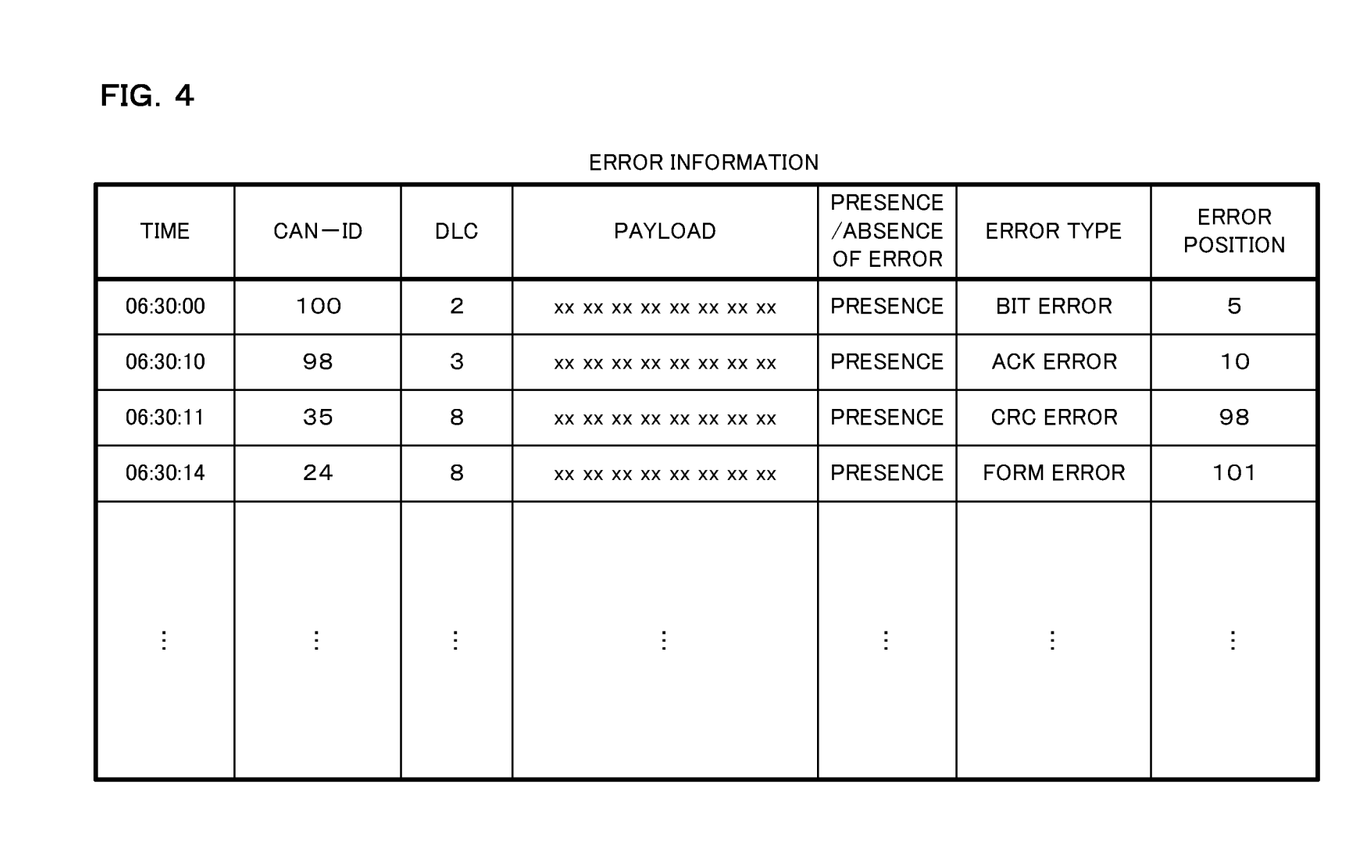
FIG. 4 is a schematic diagram illustrating an example of error information.

The recording unit 54 of the monitoring device 5 is configured with a data rewritable and non-volatile storage device such as, for example, a flash memory, a hard disk or the like. The recording unit 54 according to the present embodiment records therein information related to an error in message transmission occurring in the in-vehicle network, as error information 54a. FIG. 4 is a schematic diagram illustrating an example of error information 54a. In the error information 54a, time, CAN-ID, data length code (DLC), payload, the presence/absence of error, error type and error position are recorded.

The time in the error information 54a represents the transmission start time, error determination time or transmission completion time of a message determined as including an error. The processor 51 or CAN controller 52 in the monitoring device 5 has a function of a timer or clock, and may obtain time when an error occurs. It is to be noted that the time information may not necessarily be the time obtained as absolute time obtained from a clock function or the like. For example, it may also be a time period elapsed since the monitoring device 5 is started. Moreover, in the case where the monitoring device 5 is configured to periodically transmit information, for example, it may also be a time period elapsed since the information was transmitted. It may also be information about time or a time period other than the ones described above. The CAN-ID in the error information 54a represents a CAN-ID attached to a message determined as including an error. The DLC in the error information 54a represents the data length of a payload included in the message, and more specifically corresponds to 4-bit information included in the control field of CAN. The payload represents effective information excluding a header or the like contained in the message, and more specifically, information itself of the data field of CAN.

The presence/absence of error in the error information 54a represents information indicating the presence/absence of the occurrence of an error in the message, and either "present" or "absent" is set. However, as the monitoring device 5 is configured to record only the information about the message in which an error occurs in the present embodiment, the error information 54a may not necessarily include the column of the presence/absence of error. The column of the presence/absence of error may only be employed in the case where, for example, the monitoring device 5 is configured to store a communication history regardless of the presence or absence of an error.

The type of error in the error information 54a is a factor for determining an error. While a bit error, an ACK error, a CRC error and a form error are recorded under the type of error in the present example, these are mere examples and a type of error other than these may also be set. The error position in the error information 54a is information indicating the position of bits where the CAN controller 52 determines that an error is included in the message.

It is noted that the CAN-ID, DLC, payload, presence/absence of error, type of error and position of error included in the error information 54a are determined by the CAN controller 52, are notified by the CAN controller 52 to the processor 51, and are recorded by the processor 51 in the recording unit 54. The time included in the error information 54a may be determined by either one of the processor 51 or the CAN controller 52, but is determined by the CAN controller 52 in the present embodiment.

The out-of-vehicle communication unit 55 in the monitoring device 5 performs communication with a device such as a server device installed outside the vehicle 1 via, for example, a mobile phone communication network or wireless local area network (LAN). It is not necessary for the monitoring device 5 to always include the out-of-vehicle communication unit 55. For example, it may be configured that another ECU 3 mounted to the vehicle 1 includes an out-of-vehicle communication unit, and the monitoring device 5 performs communication with a server device outside the vehicle via the ECU 3.

<Error Monitoring Processing>

The CAN controller 52 in the monitoring device 5 samples and obtains a signal output to the CAN bus by the ECUs 3, and continuously monitors the messages transmitted by the ECUs 3. The error determination part 71 in the CAN controller 52 determines the presence/absence of an error for a message transmitted on the CAN bus. The error determination part 71 determines the presence/absence of an error such as, for example, a bit error, a stuff error, a CRC error, a form error and an ACK error. These errors are defined by the existing CAN protocol, and thus will not be described in detail. The error determined by the error determination part 71 is not limited to the ones described above. For example, in the CAN expanded system to which an authentication function is added using technology such as message authentication code (MAC), digital signature, encryption or the like to a message, the error determination part 71 may be configured to determine the presence/absence of an authentication error occurring in the authentication processing.

The error notification part 72 of the CAN controller 52 notifies the processor 51 of information related to a message determined that an error is present therein by the error determination part 71. The error notification part 72 here outputs a signal of interrupt or the like to the processor 51 to provide a notification. Moreover, the error notification part 72 obtains the information such as the time of determining an error, CAN-ID, DLC, payload, type of error and position of error, for the message determined that an error is present therein, and notifies the processor 51 thereof.

The processor 51 in the monitoring device 5 learns the occurrence of an error by receiving a notification from the CAN controller 52, while obtaining information related to the error from the CAN controller 52. The error information recording processing part 62 of the processor 51 additionally records the information obtained by the CAN controller 52 to the error information 54a in the recording unit 54. It is also possible here that the error information recording processing part 62 records information so as to make it difficult to decode or modify the error information 54a by using the technique such as encryption or digital signature.

Figure 5:
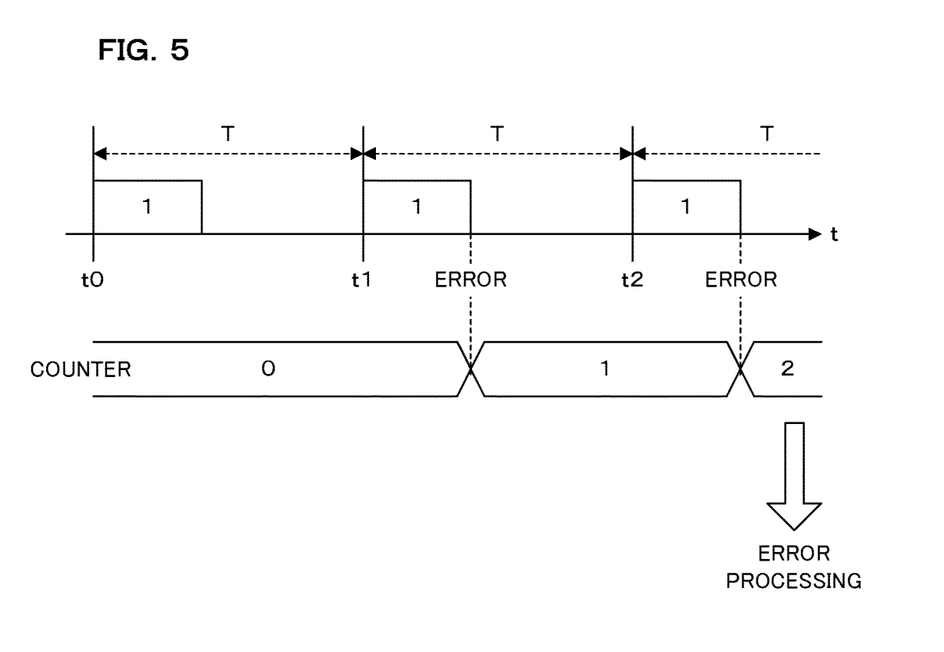
FIG. 5 is a schematic diagram illustrating an example of determination as to whether or not error processing is performed.

The error analysis part 61 of the processor 51 determines whether or not prescribed error processing is to be executed for the message in which an error occurs, based on the monitoring information 53a stored in the ROM 53. FIG. 5 is a schematic diagram illustrating an example of determination as to whether or not error processing is performed, which shows an example of determination based on the error frequency. The illustrated example is for a message with the CAN-ID of 1 shown in FIG. 3. In the message, the error frequency is set as 2 in the monitoring information 53a, and an external notification is set as error processing. The error frequency in the monitoring information 53a corresponds to a setting as to how many times errors occur in succession to perform error processing.

The error analysis part 61 has a counter for counting the frequency of the error occurrence for each CAN-ID. If an error is notified from the CAN controller 52, the error analysis part 61 obtains the CAN-ID of the message in which an error occurs based on this notification, and adds 1 to the value of the counter corresponding to this CAN-ID. Moreover, the error analysis part 61 refers to the monitoring information 53a in the ROM 53, and obtains a numeric value of the error frequency set for the CAN-ID of the message in which the error occurs. If the value of the counter reaches the set error frequency, the error analysis part 61 determines to perform error processing. If it is determined that error processing is performed, the error processing part 63 in the processor 51 performs error processing set as the error processing in the monitoring information 53a.

In the example illustrated in FIG. 5, no error occurs in the message with the CAN-ID of 1 transmitted at time t0. An error occurs in the message transmitted at time t1, and the error analysis part 61 changes the value of the counter from 0 to 1 accordingly. An error also occurs in the message transmitted at time t2, and the error analysis part 61 changes the value of the counter from 1 to 2 accordingly. Since the error frequency is set to 2 in the monitoring information 53a for the message with the CAN-ID of 1, the error analysis part 61 determines that error processing is performed at the time point when the value of the counter reaches 2. In the monitoring information 53a illustrated in FIG. 3, error processing for the message with the CAN-ID of 1 is set as an external notification. Thus, the error processing part 63 performs processing of notifying an external server device or the like of the error occurrence through the out-of-vehicle communication unit 55.

It is necessary for the error analysis part 61 to initialize the value of the counter to 0 in the case where no error occurs in the message transmitted at time t2. It is assumed in the present embodiment that the ECU 3 is to transmit the message with the CAN-ID of 1 at the cycle T, and the error analysis part 61 initializes the value of the counter if an error is not notified even when a predetermined period of time (e.g., cycle T or a longer period) elapses after the value of the counter is increased. In the case where the CAN controller 52 is configured to notify the processor 51 of the reception of a message even if no error occurs in the message, the error analysis part 61 may also initialize the value of the counter according to the notification.

Figure 6:
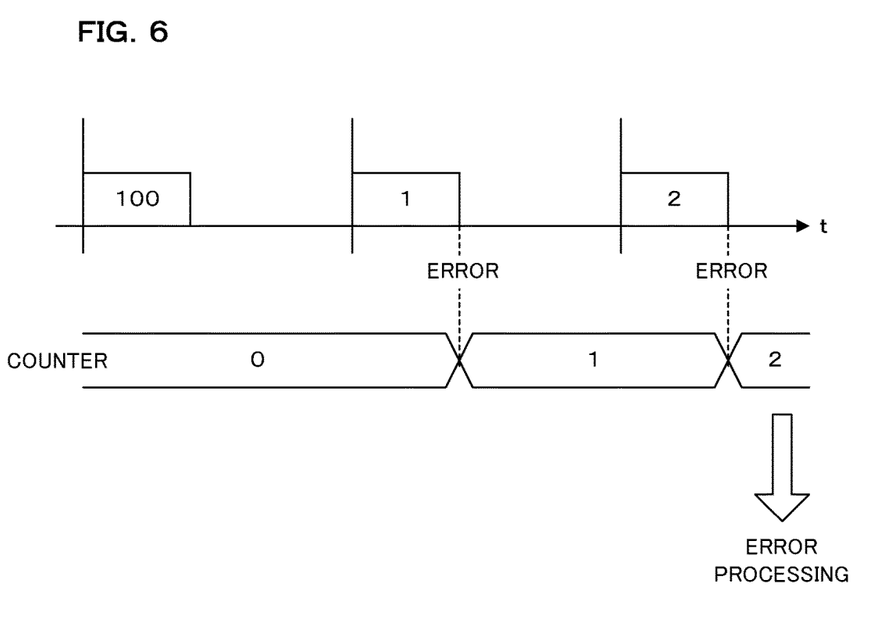
FIG. 6 is a schematic diagram illustrating an example of determination as to whether or not error processing is performed.

FIG. 6 is a schematic diagram illustrating an example of determination as to whether or not error processing is performed, which shows an example of determination based on the related message. In the illustrated example, a message with the CAN-ID of 1 illustrated in FIG. 3 is shown. For the message, a message with the CAN-ID of 2 is set as the related message in the monitoring information 53a. The error analysis part 61 has a counter for counting the number of errors occurring sequentially with the related message for each CAN-ID (this counter is different from the one illustrated in FIG. 5). If an error is notified from the CAN controller 52, the error analysis part 61 adds 1 to the value of the counter corresponding to the CAN-ID of the message in which an error occurs.

Subsequently, the error analysis part 61 holds the value of the counter without being changed if an error occurs again in the message with the CAN-ID of 1 before the transmission cycle T of the message with the CAN-ID of 1 elapses. If an error occurs in the message with the CAN-ID of 2 set as the related message before the transmission cycle T elapses, the error analysis part 61 adds 1 to the value of the counter. If no error occurs in the message with the CAN-ID of 1 or 2 before the transmission cycle T elapses, the error analysis part 61 initializes the value of the counter to 0.

In the present example, as one CAN-ID is set as the related message, the error analysis part 61 determines to perform error processing when the value of the counter reaches 2. In the case where, for example, two CAN-IDs are set as the related messages, the error analysis part 61 determines that error processing is performed when the value of the counter reaches 3. That is, the error analysis part 61 determines that error processing is performed when the value of the counter reaches a value obtained by adding 1 to the set number for the related messages. Since the set error processing for the CAN-ID of 1 is set as an external notification in the monitoring information 53a, the error processing part 63 notifies an external server device or the like of the occurrence of the error through the out-of-vehicle communication unit 55.

In the case where an internal notification is set as error processing, the error processing part 63 gives an operation command to an appropriate ECU 3 in the vehicle 1 through the error processing command transmission part 73 of the CAN controller 52. For example, in the case where a warning message is displayed as the internal notification, the error processing part 63 transmits a command to display the warning message to the ECU 3, a car navigation device or the like that controls a display installed in the vehicle 1. Moreover, in the case where, for example, alarm sound is output as the internal notification, the error processing part 63 transmits a command to output the alarm sound to the ECU 3, audio device or the like that controls a speaker installed in the vehicle 1. Furthermore, as the error processing, the processing such as shutdown of a system may also be set. Here, the error processing part 63 transmits an operation stop command to the ECU 3 which should stop operating.

<Flowchart>

Figure 7:
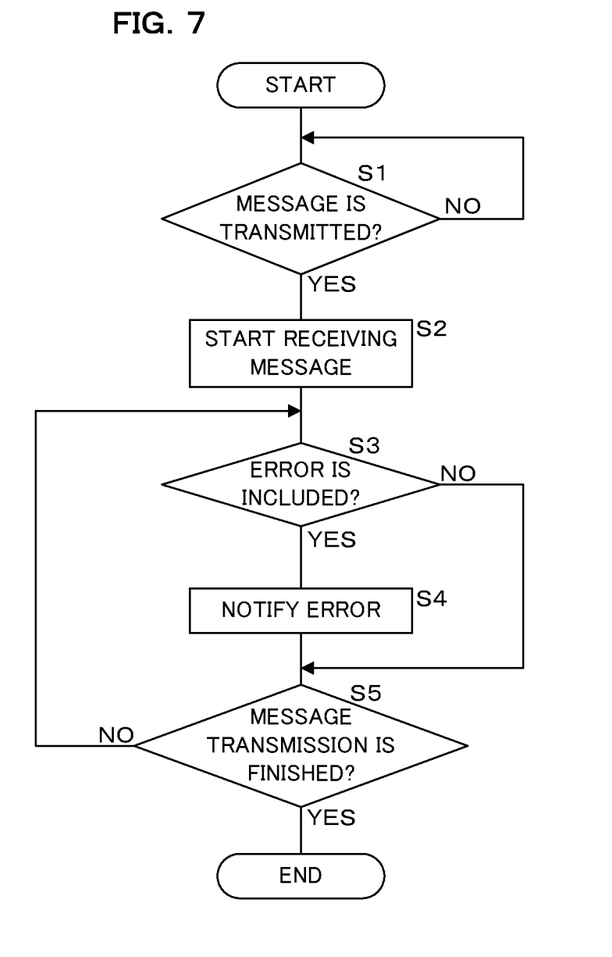
FIG. 7 is a flowchart illustrating a procedure of processing performed by the CAN controller.

FIG. 7 is a flowchart illustrating a procedure of processing performed by the CAN controller 52. The CAN controller 52 determines whether or not a message is transmitted by the ECU 3 by sampling the potential of the CAN bus (step S1). If a message is not transmitted (S1: NO), the CAN controller 52 waits until a message is transmitted. If a message is transmitted by the ECU 3 (S1: YES), the CAN controller 52 starts receiving the transmitted message (step S2).

Subsequently, the error determination part 71 of the CAN controller 52 determines whether or not an error is included in the message transmitted by the ECU 3 on the CAN bus (step S3). If the error determination part 71 determines that an error is included in the message (S3: YES), the error notification part 72 of the CAN controller 52 notifies the processor 51 of the error by outputting a signal such as interrupt (step S4), and proceeds to step S5. If determined that an error is not included (S3: NO), the CAN controller 52 proceeds to step S5 without notification of the error.

The CAN controller 52 determines whether or not message transmission by the ECU 3 is finished (step S5). If the message transmission is not finished (S5: NO), the CAN controller 52 returns the processing to step S3. If the message transmission is finished (S5: YES), the CAN controller 52 terminates the processing.

Figure 8:
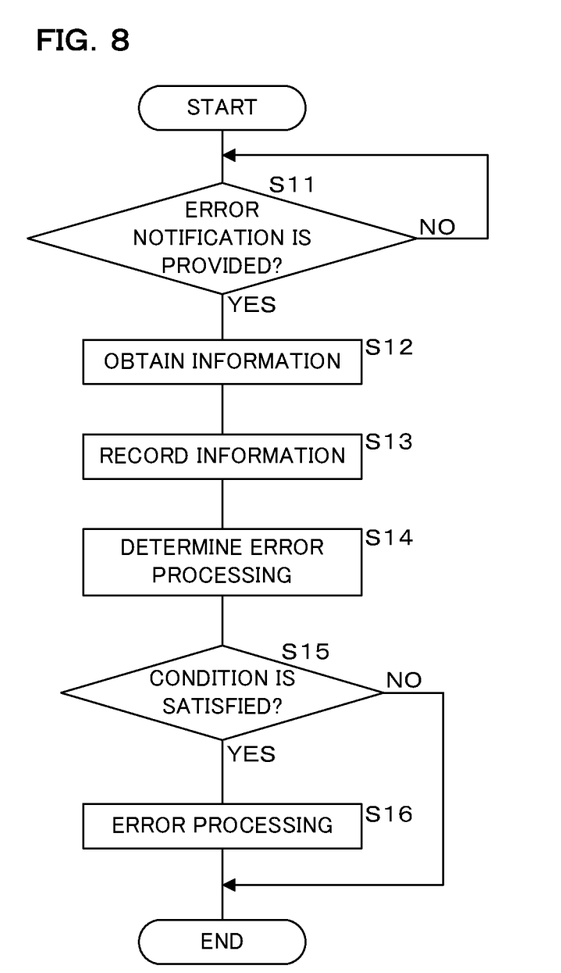
FIG. 8 is a flowchart illustrating a procedure of processing performed by the processor.

FIG. 8 is a flowchart illustrating a procedure of processing performed by the processor 51. The processor 51 determines whether or not an error notification is provided from the CAN controller 52 by a signal such as interrupt (step S11). If the error notification is not provided (S11: NO), the processor 51 waits until the error notification is provided. If the error notification is provided (S11: YES), the processor 51 obtains information related to the occurred error, for example, information about the CAN-ID of the message in which an error occurs, the type of error and the like, from the CAN controller 52 (step S12). The error information recording processing part 62 of the processor 51 records information obtained at step S12 as the error information 54a in the recording unit 54 (step S13).

Subsequently, the error analysis part 61 of the processor 51 determines error processing to determine whether or not error processing is performed, based on whether or not a condition such as the error frequency and related message set for the monitoring information 53a in the ROM 53 is satisfied (step S14). The error analysis part 61 determines whether or not a condition set for the monitoring information 53a is satisfied (step S15), and if the condition is not satisfied (S15: NO), terminates the processing without performing the error processing. If the condition is satisfied (S15: YES), the error processing part 63 of the processor 51 performs error processing set for the monitoring information 53a (step S16), and terminates the processing.

<Conclusion>

In the CAN communication system according to the present embodiment, the monitoring device 5 is connected to a common CAN bus performing communication by multiple ECUs 3 and, if an ECU 3 transmits a message, determines by the monitoring device 5 whether or not the message includes an error. In the case where an error is included in the transmitted message, the monitoring device 5 records in the recording unit 54 information concerning the error in the message as error information 54a. This allows the monitoring device 5 to record information related to the error in message transmission for all the ECUs 3 connected to the CAN bus. Accordingly, if a malfunction occurs in the CAN communication system, information that can identify the cause of the malfunction may be obtained by inspecting the error information 54a recorded in the recording unit 54 of the monitoring device 5. Moreover, even if the CAN bus is attacked by an attacker, it is possible to identify the cause thereof.

Furthermore, the information recorded as the error information 54a by the monitoring device 5 includes CAN-IDs attached to messages. This can facilitate identification of the ECU 3 from which the message including an error is transmitted. Moreover, the error information 54a includes at least one piece of information among the time information, DLC, payload, presence/absence of error, type of error, position of error and so forth. This facilitates more specific identification of the cause or the like of the error occurrence.

The monitoring device 5 stores the details of error processing for each CAN-ID in the monitoring information 53a in the ROM 53, and if an error occurs, the error processing according to the CAN-ID is performed. For example, the monitoring device 5 may perform error processing such as notification of an error occurrence to an external server device or the like outside the vehicle 1 through the out-of-vehicle communication unit 55 using wireless communication or the like, display of a warning message or output of alarm sound in the vehicle 1, or shutdown of the system or the corresponding network. The error processing may set appropriate processing details for each CAN-ID of the message, in addition to the ones described above.

The monitoring device 5 stores, for the monitoring information 53a, a condition under which error processing is performed, and if an error occurs and the stored condition is satisfied, error processing is performed. As to the condition for error processing, a condition such as the frequency of error occurrence and the occurrence of an error in a related message may be set. The condition for the error processing may be set for each CAN-ID of a message. Accordingly, the monitoring device 5 may perform error processing not simply when an error occurs but in accordance with the frequency, condition or the like of the occurrence of an error.

Furthermore, the monitoring device 5 comprises the CAN controller 52 performing communication in accordance with the CAN protocol and the processor 51 performing various types of information processing. The CAN controller 52 may determine by the error determination part 71 whether or not an error is included in message transmission, and if determined that an error is included, may notify the processor 51 of the CAN-ID attached to the message through the error notification part 72. The processor 51 performs processing of recording the error information 54a containing the notified CAN-ID in the recording unit 54 by the error information recording processing part 62 if notified of the error occurrence from the CAN controller 52.

The conventional CAN controller does not have a function of notifying the processor of information such as a CAN-ID at the time of the occurrence of an error, and thus the processor can only obtain information related to an error occurring in a message transmitted by itself. As the monitoring device 5 according to the present embodiment is configured to notify, by the CAN controller 52, the processor 51 of the CAN-ID of the message in which an error occurs, the processor 51 is able to obtain information related to an error occurring in a message transmitted by any ECU 3, making it possible to record error information related to all the ECUs 3 in the system.

While it is configured, in the present embodiment, that an error analysis part 61, error information recording processing part 62 and error processing part 63 are provided in the processor 51 in the monitoring device 5, the configuration is not limited thereto. A part or the whole of the error analysis part 61, the error information recording processing part 62 and the error processing part 63 may be provided in the CAN controller 52. While it is further configured that the notification to the processor 51 from the CAN controller 52 may be performed using an interrupt signal, it is not limited thereto but may also be configured to provide a notification by a method other than the interrupt signal.

Furthermore, the monitoring information 53a illustrated in FIG. 3 is a mere example and is not limited thereto. Though two conditions for the error frequency and related message are shown as the conditions for performing error processing, a condition other than these may also be employed. While the external notification and internal notification have been described as the error processing and related error processing, various other processing may also be employed such as system shutdown, stopping of the operation of a specific ECU 3 or discard of the message in which an error occurs, for example.

Furthermore, the error information 54a illustrated in FIG. 4 is a mere example and is not limited thereto. In the error information 54a, various other types of information not illustrated in FIG. 4 may also be recorded. While the monitoring device 5 is configured to record information about a message in which an error occurs in the present embodiment, it is not limited thereto but may also be configured to record, as required, information also about a message in which no error occurs.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A controller area network (CAN) communication system comprising:
   a plurality of communication devices connected to each other via a common communication line and performing communication in accordance with a CAN protocol, the CAN communication system further comprising:
   an error information recording device having: an error determination part connected to the communication line and determining whether or not an error is included in a message transmitted by at least one of the plurality of communication devices;
   an error information recording part recording, if the error determination part determines that an error is included in the message, an information concerning the error of the message, wherein the information includes one piece of information selected from the group consisting of a type of an error, a time the error occurred, a frequency of an error and a position of an error in the message;
   an error processing details storage part storing a detail of error processing performed if the error determination part determines that an error is included in a message, wherein the detail is how error processing is performed for each piece of identification information attached to a message; and
   an error processing part performing error processing based on the detail stored in the error processing details storage part; and wherein the error processing details storage part stores a condition for performing error processing, wherein the condition includes a predetermined frequency of detected errors and an identification of a related message, and the error processing part is configured to perform error processing if the error determination part determines that an error is included in a message and a condition stored in the error processing details storage part is satisfied.

2. The CAN communication system according to claim 1, wherein the information recorded in the error information recording part includes identification information attached to the message.

3. The CAN communication system according to claim 1, wherein the information recorded in the error information recording part further includes a payload of a message, and a size of the payload.

4. The CAN communication system according to claim 1, wherein the error information recording device includes a CAN controller controlling transmission and reception of a message in accordance with a CAN protocol and having the error determination part, and a processor performing processing of recording information in the error information recording part, wherein the CAN controller notifies, if the error determination part determines that an error is included in a message, the processor of identification information attached to the message, and the processor is configured to record information notified from the CAN controller in the error information recording part.

5. An error information recording device, comprising:
- an error determination part connected to a common communication line connected to a plurality of communication devices performing communication in accordance with a controller area network (CAN) protocol, and determining whether or not an error is included in a message transmitted by at least one of the plurality of communication devices;
- an error information recording part recording, if the error determination part determines that an error is included in a message, an information related to the error of the message, wherein the information includes at least one piece of information selected from the group consisting of a type of an error, a time the error occurred, a frequency of an error and a position of an error in the message;
- an error processing details storage part storing a detail of error processing performed if the error determination part determines that an error is included in a message, wherein the detail is how error processing is performed for each piece of identification information attached to a message; and
- an error processing part performing error processing based on the detail stored in the error processing details storage part; and
- wherein the error processing details storage part stores a condition for performing error processing, wherein the condition includes a predetermined frequency of detected errors and an identification of a related message, and the error processing part is configured to perform error processing if the error determination part determines that an error is included in a message and a condition stored in the error processing details storage part is satisfied.

* * * * *